United States Patent
Yang et al.

(10) Patent No.: US 10,306,329 B2
(45) Date of Patent: May 28, 2019

(54) FACILITATING MIXED SERVICE USE OF BONDED SATELLITE TRANSPONDERS

(71) Applicant: The DIRECTV Group, Inc., El Segundo, CA (US)

(72) Inventors: Trevor Yang, Lakewood, CA (US); Joseph Santoru, Agoura Hills, CA (US); James Michener, Grass Valley, CA (US); An Vuong, Gardena, CA (US); Sassan Pejhan, Los Angeles, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 475 days.

(21) Appl. No.: 15/365,166

(22) Filed: Nov. 30, 2016

(65) Prior Publication Data

US 2018/0242048 A1    Aug. 23, 2018

(51) Int. Cl.
*H04N 21/61* (2011.01)
*H04N 21/2365* (2011.01)
(Continued)

(52) U.S. Cl.
CPC ..... *H04N 21/6143* (2013.01); *H04N 21/2383* (2013.01); *H04N 21/2385* (2013.01);
(Continued)

(58) Field of Classification Search
CPC ......... H04N 21/6143; H04N 21/23655; H04N 21/2383; H04N 21/23614; H04N 21/2393
See application file for complete search history.

(56) References Cited

U.S. PATENT DOCUMENTS 5,886,995 A    3/1999  Arsenault et al.
6,323,909 B1   11/2001 Michener et al.
(Continued)

FOREIGN PATENT DOCUMENTS

CA    2276196 A1    11/1995

OTHER PUBLICATIONS

"Statistical Multiplexing in Cable TV Networks", Sep. 2016, Teleste Corporation, 4 pages. Retrieved on Sep. 23, 2016. https://www.teleste.com/sites/default/files/attachments/p2p_statmux_0816_web.pdf.
(Continued)

*Primary Examiner* — Chenea Smith
(74) *Attorney, Agent, or Firm* — Amin, Turocy & Watson, LLP

(57) ABSTRACT

Embodiments facilitating mixed service use of bonded satellite transponders in communication systems are provided. An apparatus comprises a first multiplexer configured to receive first content from first channels of a first type of channel, a second multiplexer configured to receive second content from second channels of a second type of channel, and a transport stream processor (TSP). The TSP can be configured to output the received first content and the second content to modulators respectively associated with different channels for transmission of the first type of channel and the second type of channel, wherein the different channels are transmitted to a bonded satellite transponders, which transmits to a receiver. In some embodiments, the apparatus can comprise a multiplexer aggregator coupled between the TSP and the first multiplexer and the second multiplexer. The first content can be high bit-rate information and the second content can be lower bit-rate information.

20 Claims, 10 Drawing Sheets

(51) Int. Cl.
*H04N 21/239* (2011.01)
*H04N 21/236* (2011.01)
*H04N 21/2383* (2011.01)
*H04N 21/2385* (2011.01)

(52) U.S. Cl.
CPC ... *H04N 21/2393* (2013.01); *H04N 21/23614* (2013.01); *H04N 21/23655* (2013.01)

(56) References Cited

U.S. PATENT DOCUMENTS

| | | | |
|---|---|---|---|
| 6,987,739 | B2 | 1/2006 | Kitazawa et al. |
| 7,065,213 | B2 | 6/2006 | Pinder |
| 7,068,724 | B1 | 6/2006 | Hamilton |
| 7,266,133 | B2 | 9/2007 | Wu et al. |
| 7,376,159 | B1 | 5/2008 | Stanger et al. |
| 7,450,609 | B2 | 11/2008 | Liu et al. |
| 7,486,732 | B1 | 2/2009 | Ducharme et al. |
| 7,535,900 | B2 | 5/2009 | Shenoi |
| 7,587,736 | B2 | 9/2009 | Summers et al. |
| 8,166,170 | B2 | 4/2012 | Segev et al. |
| 8,200,149 | B1 | 6/2012 | Chen |
| 8,411,696 | B1 | 4/2013 | Ko et al. |
| 8,621,543 | B2 | 12/2013 | Segev et al. |
| 8,634,436 | B2 | 1/2014 | Jones et al. |
| 9,215,486 | B2 | 12/2015 | Hefeeda et al. |
| 9,432,728 | B1 | 8/2016 | Rothaus |
| 9,525,978 | B2 | 12/2016 | Pontual et al. |
| 9,584,838 | B2 | 2/2017 | Rothaus |
| 2006/0130113 | A1 | 6/2006 | Carlucci et al. |
| 2012/0151542 | A1 | 6/2012 | Shafrir et al. |
| 2013/0003800 | A1 | 1/2013 | Finkelstein et al. |
| 2013/0070839 | A1 | 3/2013 | Magee |
| 2013/0287474 | A1 | 10/2013 | Martin et al. |

OTHER PUBLICATIONS

"Statistical Multiplexing/Remultiplexers", Mar. 2006, Xilinx, 36 pages. Retrieved on Sep. 23, 2016. http://www.xilinx.com/esp/broadcast/collateral/statmuxes.pdf.

"An Introduction to Time-Frequency Slicing", Feb. 2016, 25 pages. Retrieved on Sep. 23, 2016. https://tech.ebu.ch/docs/techreports/tr035.pdf.

"Satellite Broadcast Primary Distribution to Headends", Mar. 2014, Newtec, 12 pages. Retrieved on Sep. 23, 2016. http://www.newtec.eu/frontend/files/userfiles/files/App%20Note%20Satellite%20Broadcast%20Primary%20Distribution%20to%20Headends%20Rev_1(1).pdf.

Chen, "Combining Transponder Bandwidths for Source and Forward Error Correction Encoding Efficiency," Unpublished U.S. Appl. No. 13/484,756, filed May 31, 2012, The DIRECTV Group, Inc., 21 pages.

FACILITATING MIXED SERVICE USE OF BONDED SATELLITE TRANSPONDERS

TECHNICAL FIELD

The subject disclosure relates generally to communications systems, and, for example, to systems, methods and/or machine-readable storage media for facilitating mixed service use of bonded satellite transponders (BSTs) in communication systems.

BACKGROUND

With advances in technology, high bit rate content can be provided. However, systems may also be configured to receive legacy, lower bit rate content. Precious resources can be wasted if the system is designed for only lower bit rate or only higher bit rate content. Accordingly, systems, apparatus, methods and/or computer readable storage media that provide for multiple transmission modes and are designed to receive, process and/or transmit different types of content efficiently over a satellite-based communication system.

DETAILED DESCRIPTION

Figure 1:
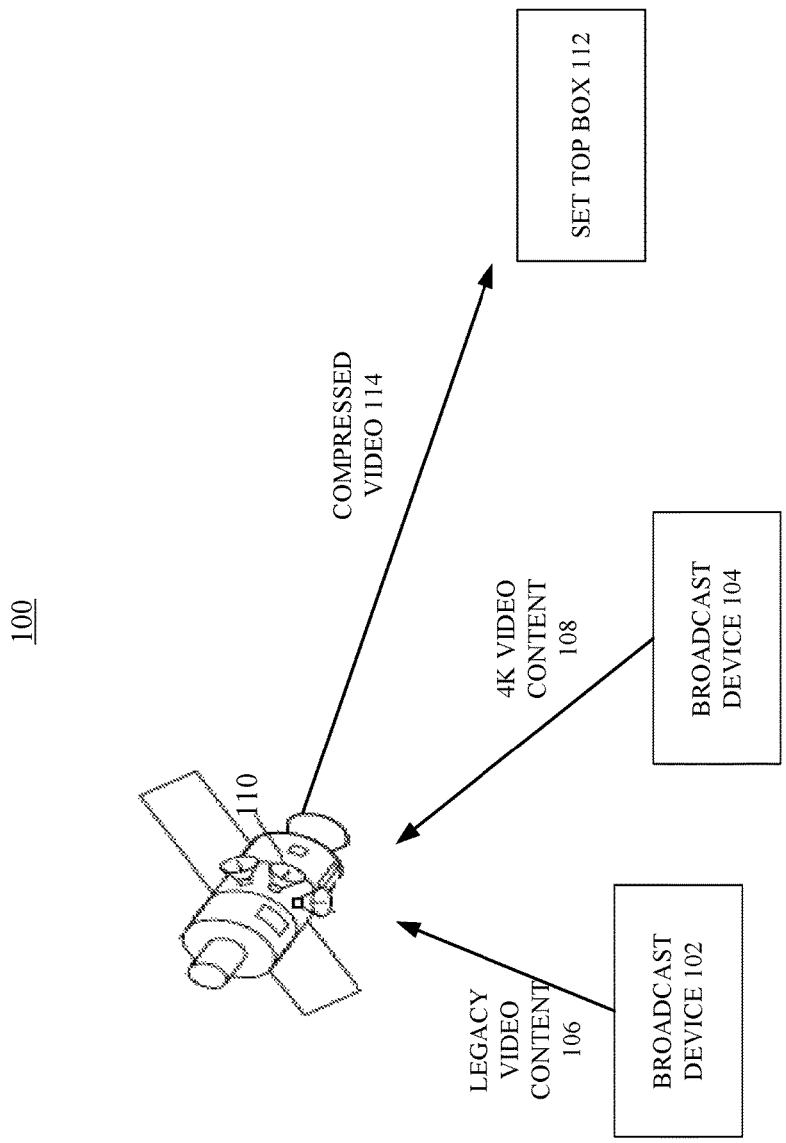
FIG. 1 illustrates an example, non-limiting block diagram of a system that facilitates mixed service use of BSTs in communication systems in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating mixed service use of BSTs in communication systems are described herein. As used herein, the terms "bonded satellite transponder" or "BST" (which are interchangeable with one another and with the terms "bonded transponder module" and "bonded transponder component") can mean a group of one or more transponders employed jointly for carrying content. In one embodiment, an apparatus comprises: a first multiplexer configured to receive first content from first channels of a first type of channel; and a second multiplexer configured to receive second content from second channels of a second type of channel. The apparatus also comprises a TSP configured to: receive the first content and the second content; and output the first content and the second content to modulators respectively associated with different channels for transmission of the first type of channel and the second type of channel, wherein the different channels are transmitted to a BSTs, which transmits to a receiver.

In another embodiment, a BST is provided. The BST can comprise a group of first transponders at a first device, associated with a first group of modulators and a transport stream processor at a second device, wherein the group of first transponders is configured to receive, from the second device, modulated first content having a first bit rate. The BST can also comprise a second transponder other than the group of first transponders, wherein the second transponder is associated with a second modulator at the second device and is configured to receive, from the second device, modulated second content having a second bit rate, and wherein the transport stream processor is configured to switch between transmission modes for transmission of the modulated first content and the modulated second content to a receiver device.

In another embodiment, a method is provided. The method can comprise processing, by a device comprising a processor, first content from a group of a first type of channels, wherein the first content has an associated first bit rate; and processing, by the device, second content from a second type of channel, wherein the second content has an associated second bit rate. The method can also comprise multiplexing, by the device, the first content and the second content and generating a stream of content. The method can also comprise outputting, by the device, the stream of content to modulators respectively associated with different channels for transmission of the first content of the stream of content and the second content of the single stream of content, wherein the modulators are paired with respective transponders of a BSTs configured to transmit modulated first content and modulated second content on a downlink via a selected transmission mode.

One or more embodiments can provide a system that can realize efficiency of multiplexing multiple channels (e.g., by bonding or using cooperatively or in conjunction, two or more transponders into a virtual fat transponder (e.g., bonded satellite transponder)). One or more embodiments can allow a satellite television provider to use satellite bandwidth, which can be a limited commodity, more efficiently to transmit high bit-rate content such as Ultra High Definition (UHD) signals, while allowing seamless back and forth switching to transmission of traditional (high definition (HD) television (HDTV) and standard definition (SD) television (SDTV)) signals as well as a mixture of UHDTV and HDTV signals.

For example, upon multiplexing numerous channels additional bandwidth can be obtained. One or more embodiments can allow legacy HD STBs to tune into the traditional HD and SD channels (but would not be able to see the 4K channels), while allowing newer IRDs to tune into both types of content (e.g., 4K and HD/SD channels).

FIG. 1 illustrates an example, non-limiting block diagram of a system that facilitates mixed service use of BSTs in communication systems in accordance with one or more embodiments described herein. System 100 is a mere embodiment of a simplified system of various component for receipt, processing and/or transmission of content having different bit rates and other components can be included in other embodiments. For example, in some embodiments, multiple (e.g., 2 or more) 4K (or, in some embodiments, 8K) channels and numerous (e.g., 4 or more) HD channels can be transmitted over more than one transponder that together may be considered a bonded satellite transponder 240 in some embodiments.

Figure 2:
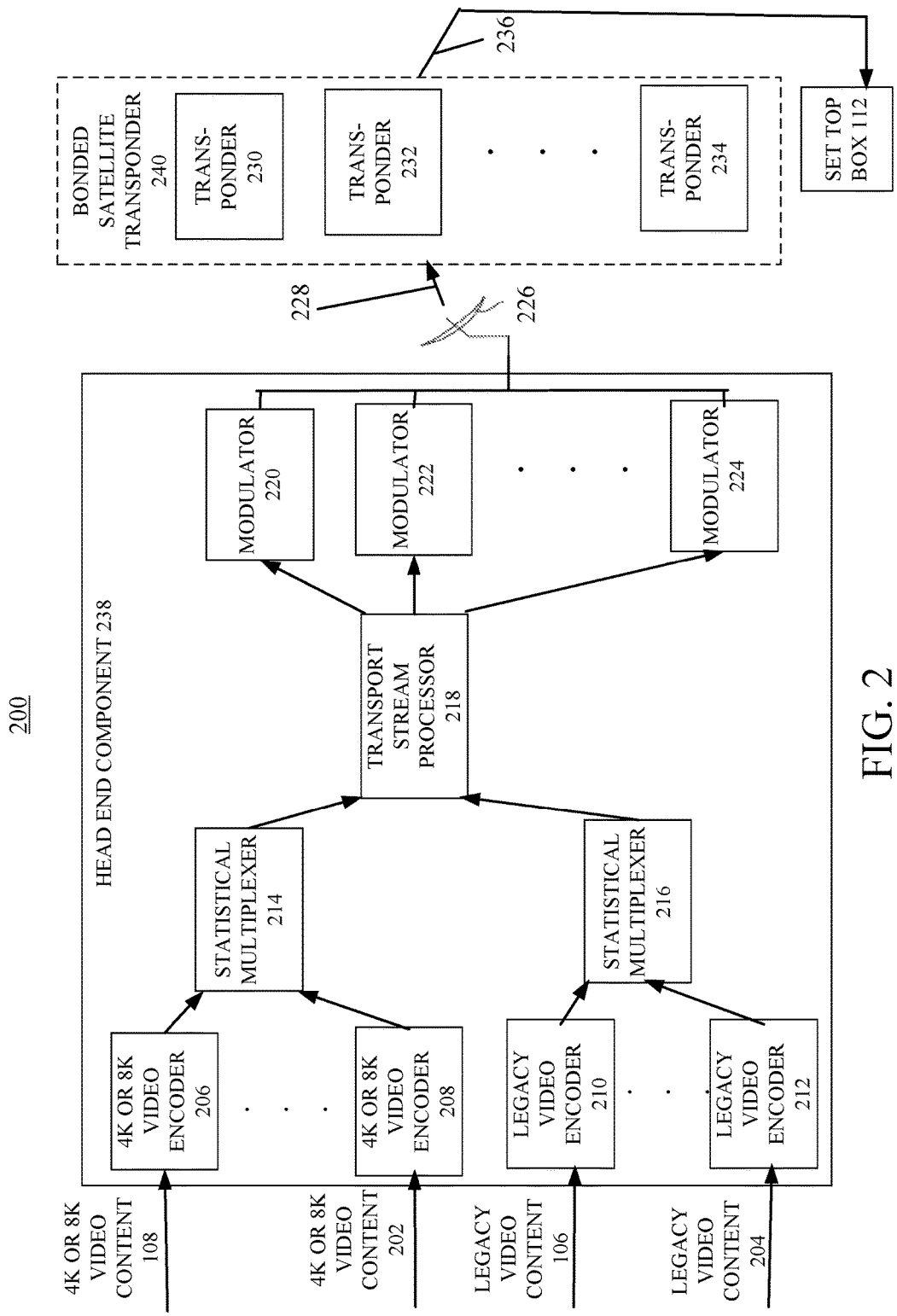
FIG. 2 illustrates an example, non-limiting system that facilitates transmission of a mixture of channels having different bit rates and employing statistical multiplexers over one or more bonded transponders in accordance with one or more embodiments described herein.

In some embodiments, the systems of FIGS. 1, 2 and/or 3 can be included in the head end component 238 (however, these systems cannot be included in IRDs). In some embodiments, the portion of the head end component 238 impacted can include an interface between statistical multiplexers 214, 216 and satellite transmitters.

As shown, broadcast devices 102, 104 can generate and transmit on the uplink channel to a satellite 110 legacy video content 106 and 4K or 8K (e.g., UHD) content 108, respectively. In some embodiments, in addition to or as an alternative to 4K and/or 8K, other high data rate services that cannot be efficiently multiplexed in a single satellite transponder (or, for example, in a single communication channel for other services) can be employed. The satellite 110 can transmit the received content 106, 108 via one or more transponders (not shown) that comprise a bonded satellite transponder (not shown) at the satellite 110. In some embodiments, the satellite 110 can act as a mirror and amplifier of the received content 106, 108. The content can be transmitted on the downlink channel as compressed video 114 in some embodiments to a receiver (not shown) of a set top box (STB) 112. In various embodiments, the STB 112 can include a single type of receiver (e.g., a legacy receiver configured to receive legacy video content 106 or a high bit rate receiver configured to receive 4K video content and/or a combination of receivers that can receive the legacy video content 106 on one type of receiver at the STB 112 and the 4K video content on a second type of receiver at the STB 112. While the embodiment shown is for video content, in various other embodiments, any number of different types of content is envisaged and can be employed herein. In some embodiments, UHD video content can be video content that is 4K or higher (and any other content can be considered to be legacy content).

Figure 3:
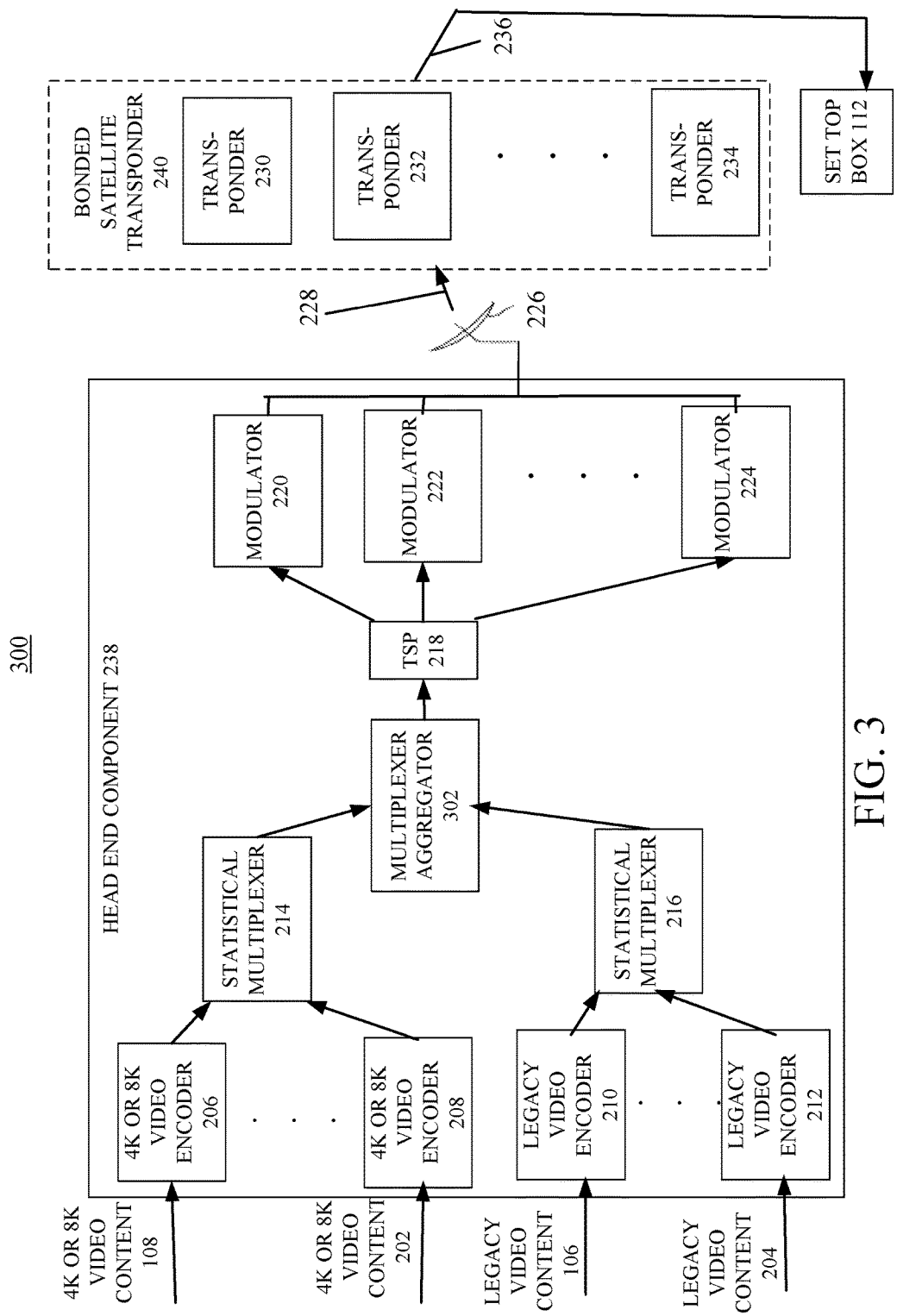
FIG. 3 illustrates an example, non-limiting system that facilitates transmission of a mixture of channels having different bit rates and employing a multiplexor aggregator over one or more bonded transponders in accordance with one or more embodiments described herein.

FIG. 2 illustrates an example, non-limiting system that facilitates transmission of a mixture of channels having different bit rates and employing statistical multiplexers over one or more bonded transponders in accordance with one or more embodiments described herein. FIG. 3 illustrates an example, non-limiting system that facilitates transmission of a mixture of channels having different bit rates and employing a multiplexor aggregator over one or more bonded transponders in accordance with one or more embodiments described herein. Repetitive description of like elements employed in other embodiments described herein is omitted for sake of brevity.

As shown in FIGS. 2 and 3, 4K video content 108, 202 can be received by one or more of 4K video encoders 206, 208 and legacy video content can be received by one or more of legacy video encoder 210, 212. The content 108, 202 can be received by statistical multiplexer 214 and the content 106, 204 can be received by statistical multiplexer 216. In some embodiments, statistical multiplexers 214, 216 combine together packets of content (e.g., content 108, 202, 106, 204) (e.g., in some embodiments, compressed video and/or audio data streams) into a single data stream that can have a peak bandwidth within the capacity of an individual modulator carrier.

Compressed video signals are variable bit rate in nature while satellite transponders typically have a fixed transmission rate. The efficient transmission of compressed video signals over a satellite transponder can be performed via multiple video signals being statistically multiplexed together, resulting in a statistical multiplexing (statistical multiplexer 214 or 216) gain. The statistical multiplexer 214 or 216 gain can increase (albeit with diminishing returns) as the number of compressed video signals multiplexed together increases. UHD TV (UHDTV) signals can utilize 2.5 to 4 times the bandwidth of HD channels. UHD signals are also referred to herein as "4K" or "4KTV" signals. In various embodiments described herein, one or more UHDTV channels can be multiplexed onto one or more transponders, thereby achieving significant statistical multiplexer 214 or 216 gain.

In some embodiments, the outputs of these legacy encoders will still be statistically multiplexed. The statistical multiplexer, however, can have the ability to allow specification of subgroups within the group of streams being multiplexed together. For each subgroup (or, for one or more subgroups) the user should be able to specify the total bit rate of that subgroup. This is important, since in some embodiments, this total bit rate should not exceed the capacity of any single transponder.

Note that the example case shown in FIGS. 2 and 3 show two statistical multiplexers: the 4K content is statistical multiplexed by 214 and the traditional signals are multiplexed by 216. In theory a single statistical multiplexer may be used. In practice, the newer 4K signals will most probably be using a different compression standard (e.g. the newly released High Efficiency Video Coding (HEVC) specifications) than that used by the legacy streams (typically Moving Picture Experts Group (MPEG)-2 or Advanced Video Coding (AVC)). In some embodiments, the 4K statistical multiplexer 214 can act exactly as in the first use case albeit with fewer 4K channels and a lower bit rate allocation. The second statistical multiplexer 216 can act exactly as in the second use case albeit with fewer traditional channels and also a lower bit rate allocation. The bit rates allocated to the two statistical multiplexers 214, 216 can add up to the capacity of the bonded satellite transponder 240.

In some embodiments, one or more satellite transponders can be bonded to one another to form a single, virtual, fat transponder (e.g., bonded satellite transponder 240). The virtual, fat transponder (VFT) can transmit multiple high bit-rate video signals that have been statistically multiplexed together. The statistically multiplexed video signals can constitute a fat pipe that can be then split up and transmitted over multiple transponders that make up the VFT. The transmission can be provided in a manner that allows reconstitution of the fat pipe of content at the receiver without loss of data and without increased latency.

In some embodiments, subgroups can be determined and signaled by the statistical multiplexer 216 (e.g., or other statistical multiplexer used for traditional content) to the TSP 218. In this embodiment, there would be two passageways (e.g., in some embodiments, channels) leading into the TSP 218. The passageway emanating from the 4K encoders 206, 208 can be chunked up and split among multiple modulator/transponder pairs within the bonded group. Content from the passageway emanating from the traditional encoders (e.g., encoders 210, 212) can be intelligently routed to individual modulator/transponder pairs as described in the second use case. In an alternative embodiment, it would be possible to have an additional multiplexer aggregator (e.g., multiplexer aggregator 302 of FIG. 3) to aggregate the content from the two statistical multiplexers 214, 216 and forward them as a single stream to the TSP 218. This embodiment can be used in cases where the TSP 218 can only receive a single input stream at a time.

In some embodiments, one or more of statistical multiplexers 214, 216 will convey the information about the subgroups to the TSP 218. This can enable the TSP 218 to use those same modulator/transponder pairs within the bonded group of transponders, without exceeding the bandwidth of any single modulator. Recall that a legacy IRD may not have multiple tuners and will not have the hardware to reconstitute a fat bit stream. That is why no single legacy TV signal can be spread across two or more individual transponders. The intelligent routing by the TSP 218 will ensure that channels belonging to the same subgroup are always routed to the same modulator/transponder pair. As such, data from any given individual TV channel will typically always be routed to the same modulator, and the capacity of any given transponder will not be exceeded by the content routed to the transponder.

In system 200, the output of the statistical multiplexers 214, 216 can be received by TSP 218 as at least two concurrent or parallel streams over multiple communication channels. In system 300, the output of the statistical multiplexers 214, 216 can be received by multiplexer aggregator 302, which can generate a single stream of content and output the stream. System 300 includes a multiplexer aggregator 302 that combines the content from the two statistical multiplexers 214, 216 and forwards them as a single stream to the TSP 218. This embodiment could be used with existing equipment where the TSP 218 can only receive a single input stream at a time, and it is the only approach that could be used in the near future. Combining the two streams from the statistical multiplexers 214, 216 can include any or all of the following tasks: creating a single MPEG-2 Transport Stream (MPEG-2 TS) Program Association Table (PAT) from the two separate PATs in the two separate MPEG-2 Transport Streams; modifications to the program identification (PID) values within the combined MPEG-2 Transport Stream to ensure that there are no duplicates; recalculating Program Clock Reference (PCR) values within the combined MPEG-2 Transport Stream; and/or adding or reducing the number and location of NULL packets within the combined MPEG-2 Transport Stream.

While FIGS. 2 and 3 may depict two different types of content, in some embodiments, only one type of content (e.g., legacy content or UHD/4K content) is received and processed at head end component 238 at any particular time. In these embodiments, a single statistical multiplexer can be employed to receive and process the content.

For example, in one embodiment, if only legacy content 210, 212 is received (or, in some embodiments, only legacy content 210, 212 is received for a defined time period or no other type of content is received concurrently with the legacy content 210, 212), such content 210, 212 can be received and processed by statistical multiplexer 216 only and such content can be passed to the TSP 218 (in system 200) to TSP 218 via multiplexer aggregator 302 (in system 300). The content can be modulated by a modulator (e.g., modulator 220). The modulated content 228 can be transmitted uplink via antenna 226 to a transponder (e.g., transponder 230) that is a part of a pair with modulator 220. By way of example, but not limitation, the particular modulator and transponder that are selected to be a pair for content (and/or selected in general since different modulators and/or different transponders can be included in the head end component 238 and the bonded satellite transponder 240) can be selected based on any number of factors including, but not limited to, the type of modulator (e.g., 8 phase shift keying (8PSK) modulation, quadrature phase shift keying (QPSK) modulation, etc.), the type of transponder, uplink and/or downlink channel conditions, the bit rate of the content, desired bit error rate or quality of service or the like. The transponder 230 can be part of the bonded satellite transponder 240. The transponder 230 (or, in some embodiments, the bonded satellite transponder 240 composed of only the transponder 230 being activated) can transmit downlink modulated content 236 to a receiver of a STB (not shown).

In another embodiment, if only 4K (or, in 8K) video content 206, 208 is received, (or, in some embodiments, only 4K video content 206, 208 is received for a defined time period or no other type of content is received concurrently with the 4K (or 8K) video content 206, 208), such content 206, 208 can be received and processed by statistical multiplexer 214 only and such content can be passed to the TSP 218 (in system 200) to TSP 218 via multiplexer aggregator 302 (in system 300). The content can be modulated by a modulator (e.g., modulator 220). The modulated content 228 can be transmitted uplink via antenna 226 to a transponder (e.g., transponder 230) that is a part of a pair with modulator 220. By way of example, but not limitation, the particular modulator and transponder that are selected to be a pair for content (and/or selected in general since different modulators and/or different transponders can be included in the head end component 238 and the bonded satellite transponder 240) can be selected based on any number of factors including, but not limited to, the type of modulator (e.g., 8PSK modulation, quadrature phase shift keying (QPSK) modulation etc.), the type of transponder, uplink and/or downlink channel conditions, the bit rate of the content, desired bit error rate or quality of service or the like. The transponder 230 can be part of the bonded satellite transponder 240. The transponder 230 (or, in some embodiments, the bonded satellite transponder 240 composed of only the transponder 230 being activated) can transmit downlink modulated content 236 to a receiver of a STB 112.

At the head end component 238, the carrier-specific combined data stream can therefore be encoded, error corrected, encrypted, and modulated onto the particular carrier, which is transmitted via an uplink transmission. The satellite is equipped with multiple transponders each configured to receive a particular modulated carrier and transmit a corresponding downlink signal. The downlink signal from the satellite therefore includes modulated data at each of the carriers of the satellite transponders. At a receiver station (e.g., STB), one or more of the carriers can be tuned and demodulated, decoded, and/or decrypted to recover the combined data stream. Data packets for a desired video data stream can then be identified from the combined stream to extract the desired video within the STB. This process is shown in connection with FIGS. 2 and 3.

In the various embodiments of the BST 240 described herein, the BST 240 can be dynamically arranged and re-arranged from time to time to comprise any number of transponders 230, 232, 234. Although the term "bonded" is employed, the satellite transponders 230, 232, 234 that comprise the BST 240 need not located at the same physical location. Further, the BSTs 240 can be coupled to one another or merely used concurrently during at least one overlapping time period to process and/or transmit content. In some embodiments, the BST can transmit content on the downlink to a receiver (e.g., receiver of a STB 112).

In some embodiments, bonded transponders as used in one or more embodiments described herein can provided for two or more MPEG data streams comprised of numerous television or data channels being transmitted to a DBS2 bonding modulator; which is output to an uplink amplifier; which is transmitted to a satellite transponder (which can be comprised of a receiver, down converter, and amplifier); which can be transmitted to a satellite dish at the customer home (e.g., satellite dish-amplifier-down converter; and received by a DVBS2 satellite receiver cable of handling bonded signals. In some embodiments, the uplink amplifiers, satellite transponders (e.g., the transponders of BST 240 in FIGS. 2 and 3), and/or satellite dish components are agnostic to the bonding process. Thus, for example, the BST 240 does not change regardless of the operations described herein; rather, for example, the TSP 218, modulators and/or demodulators/forward error correction (FEC) decoding chips in the STB 112 change. Bonding of the data streams can be accomplished by the TSP 218, bonding modulator, and satellite receiver. In fact, in some embodiments, the TSP 218 must generate and insert the needed information into the MPEG data stream so that the modulator and satellite receiver can correctly handle bonded signals. As a result, what is bonded are the quasi-independent data streams that are carried by multiple satellite RF transponders. Accordingly, as used herein, in some embodiments, bonded transponders can mean bonded data streams, which create a virtual "fat pipe" comprised of the aggregated bit rate from all (or two or more) of the bonded data streams. Accordingly, as represented herein, in FIGS. 2 and 3, and as implemented in one or more embodiments described herein, BST 240 can be a bent pipe system of transponders. The satellite transponders can transmit on the downlink whatever signal is uplinked to the satellite after frequency downconversion and amplification on the satellite. As further discussed herein, the BST 240 does not switch between different modulated signals; rather, the TSP 218 performs switching and the modulators in which the data signals carried in the RF signals that are transmitted by BST 240 are changed.

As shown, the bonded satellite transponder 240 can comprise multiple transponders (e.g., transponders 230, 232, 234) each configured to receive a particular modulated carrier on the uplink as uplink content 228 and transmit a corresponding downlink signal to a STB 112 as downlink content 236. The downlink signal from the bonded satellite transponder 240 can therefore comprise modulated data at each (or, in some embodiments, one or more) of the carriers of the transponders 230, 232, 234. Data packets for a desired content stream can then be identified from the combined stream to extract the desired content within the STB 112.

The transponders (e.g., transponders 230, 232, 234) of bonded satellite transponder 240 can provide for parallel or concurrent downlink transmission of different content to be transmitted over transponder carriers. For example, content can be transmitted over the downlink from the bonded satellite transponder 240 via one or more carriers of respective transponders 230, 232, 234 to the STB 112. The receiver of the STB 112 can demodulate the content received in parallel or concurrently via the one or more transponder carriers corresponding to the one or more transponders on which the content was processed. For high bit rate content, the content can be separated and transmitted on multiple transponder carriers in parallel or concurrently (while, in some embodiments, for legacy or low bit rate content the content can be transmitted on a single transponder carrier corresponding to a single transponder). In embodiments in which both types of content are transmitted, some of the transponder carriers can be allocated for the high bit rate content and at least one of the transponder carriers can be allocated for the low bit rate content. Transmitting content on the downlink over a plurality of transponder carriers and assembling and combining the content at the STB 112 after concurrently (or in parallel) demodulating the content at the transponder carriers can be referred to as "transponder bonding" herein.

One or more transponders (e.g., transponders 230, 232, 234) that can be employed in parallel or concurrently can be a "transponder bonded carrier" or part of a bonded satellite transponder (e.g., bonded satellite transponder 240). The transponder carriers can collectively provide a virtual transmission channel (composed of a number of individual transmission channels associated with individual transponders) with a bandwidth capacity equal to the sum of the bandwidth capacities of the individual transponder carriers. Thus, one or more embodiments described herein can provide for STB 112 receipt of high bit rate content transmitted via transponder bonded carriers. Legacy STBs can comprise multiple tuners and/or demodulators to simultaneously tune and demodulate signals transmitted on different transponder carriers, and then extract content within those carriers by filtering the demodulated signal for packets with particular identifiers. As such, in one or more embodiments described herein, legacy STBs can concurrently receive content streams on different transponder carriers (e.g., such as when one program is being played at the STB 112 while another program is being recorded for later viewing).

There are three different modes/use cases that can be facilitated employing the systems 200, 300. One or more embodiments can describe methods for using the same set of bonded transponders for three different use cases: 1) transmitting very high bit-rate content to new IRDs; 2) transmitting traditional video content to legacy IRDs and 3) transmitting a combination of new high bit-rate and traditional content such that new IRDs can decode all channels while legacy boxes can decode the traditional channels.

In various embodiments, the switch from any one of the three modes to another mode can be performed within a channel change time (typically on the order of a couple of seconds). This switching can be synchronized with changes in the Electronic Program Guide displayed at the STB 112. In some embodiments, a Traffic Scheduling System can be programmed to route the output of various encoders and statistical multiplexors to the TSP 218. Switching from one mode to another can be performed by programming this component.

The first use case can comprise using a group of bonded transponders (e.g., transponders 230, 232, 234) for transmitting very high bit-rate content (e.g., 4K video content) to new integrated receiver decoders (IRDs) (e.g., IRDs at STBs). The second use case can comprise using a group of bonded transponders for transmitting traditional video content to legacy IRDs. The third use case can comprise using a group of bonded transponders for transmitting a combination of new high bit-rate and traditional content (e.g., legacy video content) such that new IRDs can decode all (e.g., or, in some embodiments, one or more) channels while legacy decoders can decode the traditional channels. In some embodiments of systems 100, 200, 300, the bonded satellite transponder 240 (e.g., the group of transponders 230, 232, 234) can switch between the three use cases with minimal disruption to service (e.g., minimal disruption of display of the content to which a channel is tuned on the STB).

Figure 4:
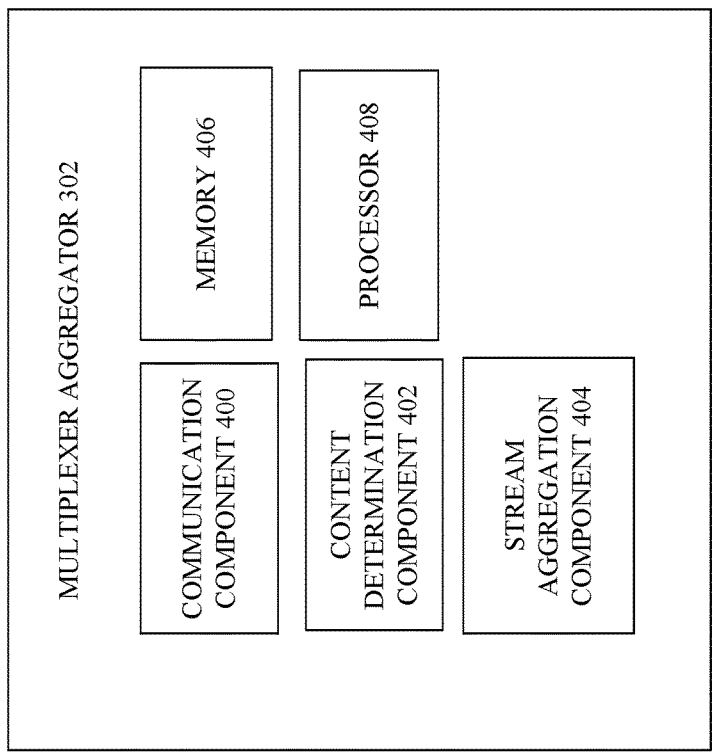
FIG. 4 illustrates an example, non-limiting block diagram of a multiplexer aggregator that facilitates mixed service use of BSTs in communication systems in accordance with one or more embodiments described herein.

FIG. 4 illustrates an example, non-limiting block diagram of a multiplexer aggregator that facilitates mixed service use of BSTs in communication systems in accordance with one or more embodiments described herein. Repetitive description of like elements employed in other embodiments described herein is omitted for sake of brevity.

The multiplexer aggregator 302 can comprise communication component 400, content determination component 402, stream aggregation component 404, memory 406 and/or processor 408. In various embodiments, one or more of communication component 400, content determination component 402, stream aggregation component 404, memory 406 and/or processor 408 can be electrically and/or communicatively coupled to one another to perform one or more functions of multiplexer aggregator 302.

The communication component 400 can transmit and/or receive first content and second content from one or more of the statistical multiplexers 214, 216. The content determination component 402 can determine one or more aspects (e.g., the type of content, the bit rate of the content, the protocol according to which the content is processed, etc.) of the content provided to the multiplexer aggregator 302. The stream aggregation component 404 can generate a stream of content to be received by the TSP 218.

Memory 406 can be a computer-readable storage medium storing computer-executable instructions and/or information for performing the functions described herein with reference to multiplexer aggregator 302 (and/or any component of multiplexer aggregator 302). For example, memory 406 can store computer-executable instructions that can be executed by processor 408 to perform multiplexing of different types of content (e.g., high bit rate and legacy content) from two or more statistical multiplexers (e.g., statistical multiplexers 214, 216), aggregation of the different content into a single stream for embodiments in which the TSP 218 is configured to receive a single stream of content, determination and/or provisioning of feedback information to the statistical multiplexers to enable control of the bit pool sizes for the first multiplexer and the second multiplexer. Processor 408 can perform one or more of the functions described herein with reference to multiplexer aggregator 302 (or any component thereof).

Figure 5:
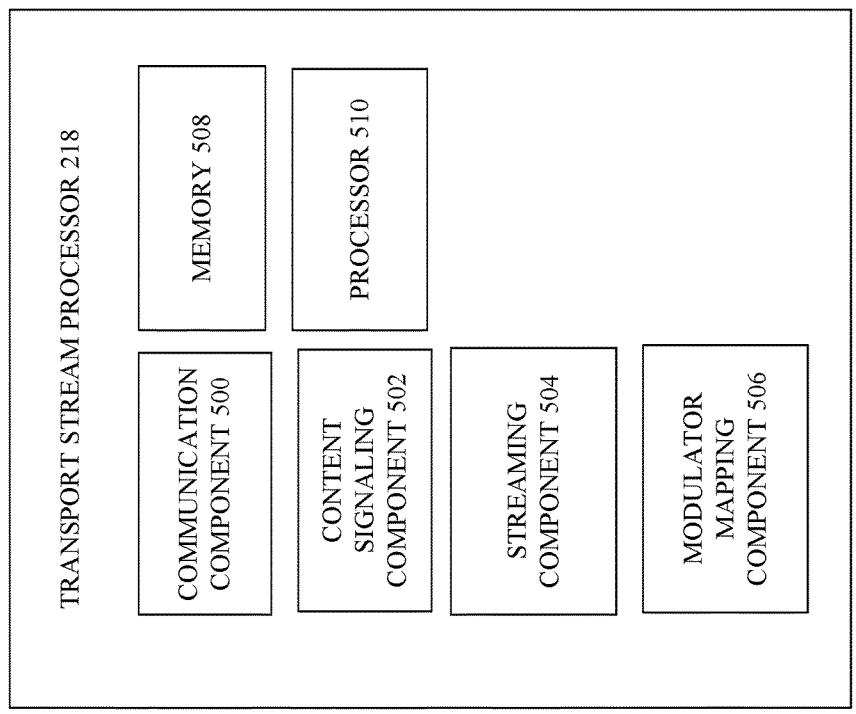
FIG. 5 illustrates an example, non-limiting block diagram of a transport stream processor (TSP) that facilitates mixed service use of BSTs in communication systems in accordance with one or more embodiments described herein.

FIG. 5 illustrates an example, non-limiting block diagram of a transport stream processor (TSP) that facilitates mixed service use of BSTs in communication systems in accordance with one or more embodiments described herein. Repetitive description of like elements employed in other embodiments described herein is omitted for sake of brevity.

The TSP 218 can comprise communication component 500, content signaling component 502, streaming component 504, modulator mapping component 506, memory 508 and/or processor 510. In various embodiments, one or more of communication component 500, content signaling component 502, streaming component 504, modulator mapping component 506, memory 508 and/or processor 510 can be electrically and/or communicatively coupled to one another to perform one or more aspects of TSP 218.

The communication component 500 can receive content from the statistical multiplexers 214, 216. For example, in some embodiments in which the multiplexer aggregator 302 is not included in the system (e.g., system 300), the communication component 500 of the TSP 218 can receive content from statistical multiplexer 214 on a first communication channel (not shown) and can receive content from statistical multiplexer 216 on a second communication channel (not shown) (e.g., system 200). In embodiments in which the TSP 218 can receive only a single stream of content (e.g., in embodiments in which the TSP 218 has or can receive content on only a single communication channel) the communication component 500 can receive the single stream of content as aggregated by the multiplexer aggregator 302 shown in FIG. 3.

The communication component 500 can be configured to receive information that has different bit rates. For example, content from the statistical multiplexer 214 can have a first bit rate and content from the statistical multiplexer 216 can have a second bit rate. The output of each statistical multiplexor is a fixed bit rate stream. So the sum of the two statistical multiplexers will also be fixed bit rate.

The content signaling component 502 can add signaling information to the content prior to output of the content by the TSP 218. The signaling information can signal information to the aggregated fixed bit rate content. In some embodiments, the signaling information can be indicative of reconstruction information to reconstruct the aggregated fixed bit rate BST 240).

The streaming component 504 can generate a stream of content combining one or more different types of content. In some embodiments, content may be received only on one statistical multiplexer and therefore the content may be steamed upon entry to the TSP 218 and the streaming component 504 can stream the content and signaling information in some embodiments.

The modulator mapping component 506 can determine one or more modulators to which to map content Memory 508 can be a computer-readable storage medium storing computer-executable instructions and/or information for performing the functions described herein with reference to TSP 218 (and/or any component of TSP 218). For example, memory 508 can store computer-executable instructions that can be executed by processor 510 to receive one or more streams (e.g., in some embodiments, the TSP 218 is configured such that the TSP 218 can receive only a single stream of content while in other embodiments, the TSP 218 can be configured to concurrently or in parallel receive multiple streams of content), map content to a modulator for transmission uplink to a transponder of the bonded satellite transponder 240 or any number of other functions. Processor 510 can perform one or more of the functions described herein with reference to TSP 218 (or any component thereof).

Figure 6:
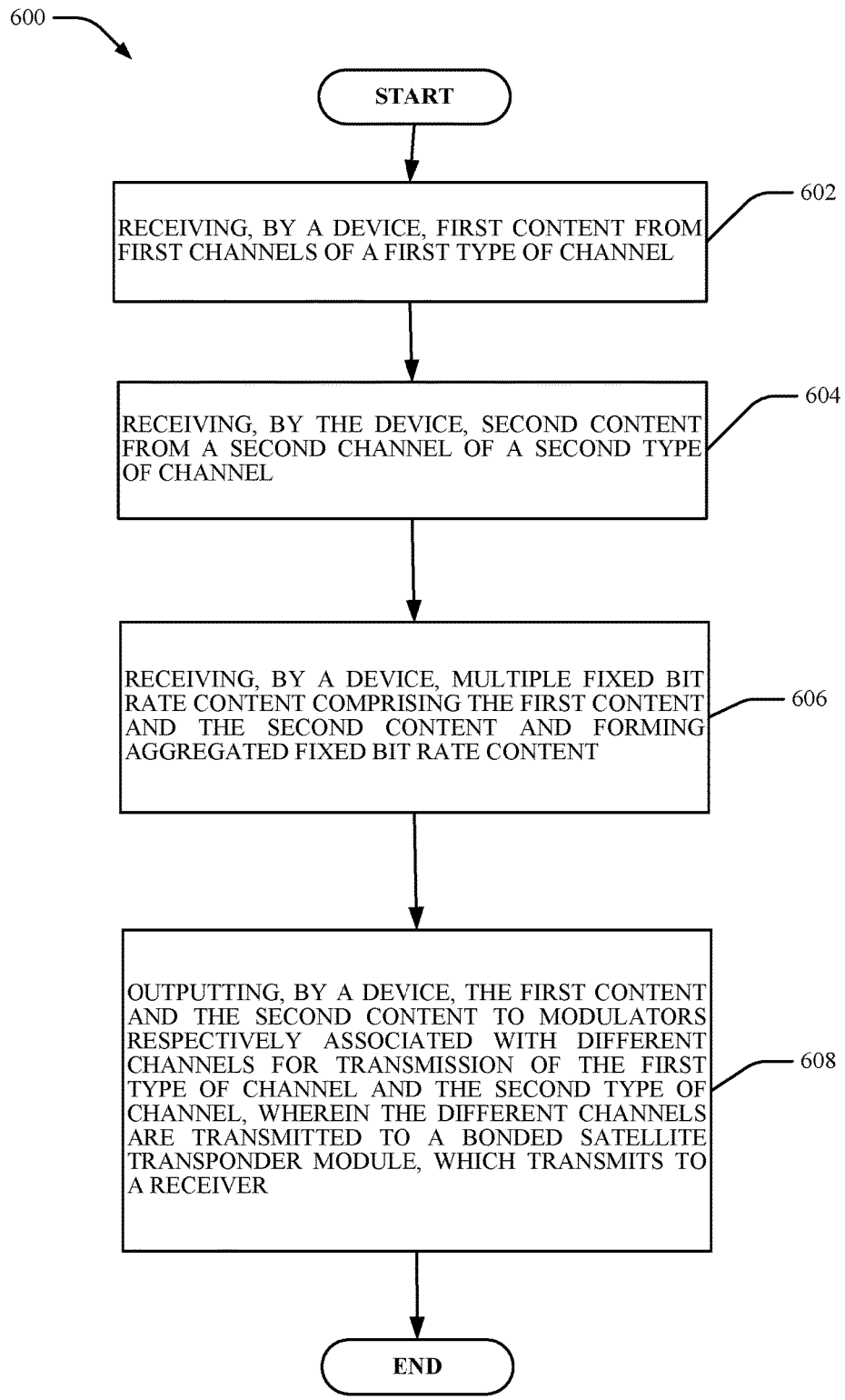
FIGS. 6, 7, 8 and 9 illustrate flowcharts of methods that facilitate mixed service use of BSTs in communication systems in accordance with one or more embodiments described herein.

FIGS. 6, 7, 8 and 9 illustrate flowcharts of methods that facilitate mixed service use of BSTs in communication systems in accordance with one or more embodiments described herein. Turning first to FIG. 6, at 602, method 600 can comprise receiving, by a device, first content from first channels of a first type of channel (e.g., by head end component 238). At 604, method 600 can comprise receiving, by the device, second content from a second channel of a second type of channel (e.g., by head end component 238). In some embodiments, the first multiplexer and the second multiplexer are statistical multiplexers.

At 606, method 600 can comprise receiving, by the device, multiple fixed bit rate content comprising the first content and the second content and forming aggregated fixed bit rate content (e.g., by head end component 238). The first type of channel can be a video channel formatted according to an ultra high definition communication protocol. In some embodiments, the first type of channel is an ultra high definition content channel and the second type of channel is a legacy content channel, and wherein a first bit rate of the ultra high definition content is a higher bit rate than a second bit rate of the legacy content channel.

At 608, method 600 can comprise outputting, by the device, the first content and the second content to modulators respectively associated with different channels for transmission of the first type of channel and the second type of channel, wherein the different channels are transmitted to a bonded satellite transponder, which transmits to a receiver.

In some embodiments, the outputting the first content and the second content to the modulators comprises outputting the first content to transponders within the bonded satellite transponders, and wherein a transponder of the transponders and a modulator of the modulators comprise a modulator/transponder pair.

In some embodiments, the first content is received via a first communication channel of the transport stream processor, and wherein the second content is received via a second communication channel of the transport stream processor (e.g., by head end component 238). In some embodiments, the transport stream processor is further configured to add signaling information to the aggregated fixed bit rate content, and wherein the signaling information is indicative of reconstruction information to reconstruct the aggregated fixed bit rate content at the receiver.

In some embodiments, the first content is associated with a higher bit rate than the second content, wherein outputting the first content and the second content to the modulators comprises outputting the first content to first transponders within the bonded satellite transponders and outputting the second content to a second transponder within the bonded satellite transponders, and wherein the second transponder is a single transponder.

The first content and the second content can be received as an aggregated stream of content output from a multiplexer aggregator, and the aggregated stream of content can comprise aggregated fixed bit rate content. The multiplexer aggregator can be coupled between the TSP and the first multiplexer and the second multiplexer. In some embodiments, the multiplexer aggregator provides feedback information to the first multiplexer and the second multiplexer to enable control of respective bit rate pool sizes employed for the first multiplexer and the second multiplexer.

In some embodiments, the TSP is further configured to add signaling information to the aggregated fixed bit rate content, and wherein the signaling information is indicative of reconstruction information to reconstruct the aggregated fixed bit rate content at the receiver. In some embodiments, the reconstruction information is indicative of how the aggregated variable bit rate content is separated and sent to individual pairs of the modulators and transponders of the bonded satellite transponders.

In some embodiments, the apparatus (e.g., head end component 238) is configured to switch between different processing modes on an order of 1-2 seconds. The switching can be between the different processing modes corresponding to a change in content mix associated with a change in an electronic program guide channel at the receiver.

Figure 7:
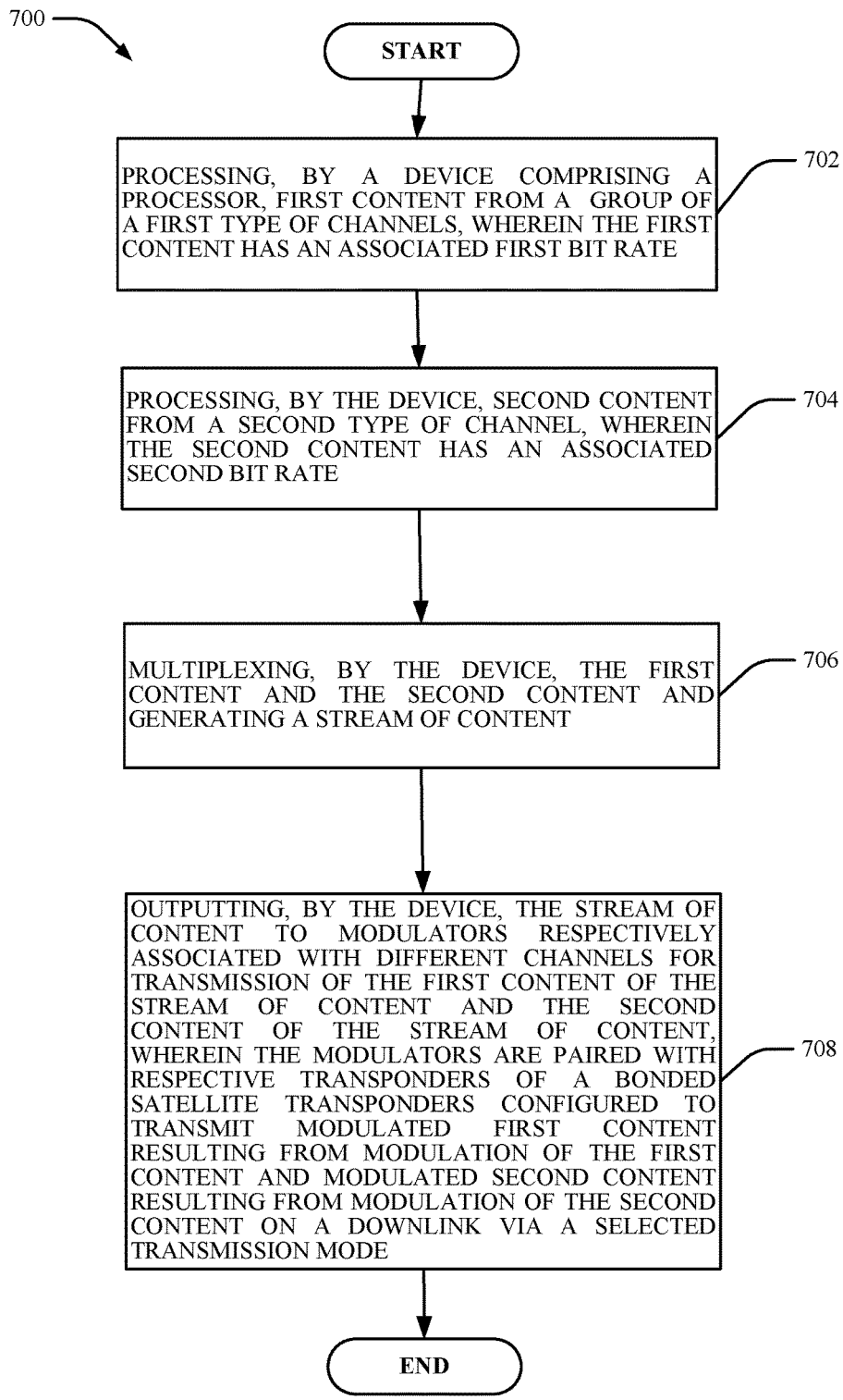

Turning now to FIG. 7, at 702, method 700 can comprise processing, by a device comprising a processor, first content from a group of a first type of channels, wherein the first content has an associated first bit rate. For example, the device can be head end component 238 (or a component of head end component 238). At 704, method 700 can comprise processing, by the device, second content from a second type of channel, wherein the second content has an associated second bit rate. At 706, method 700 can comprise multiplexing, by the device, the first content and the second content and generating a stream of content. At 708, method 700 can comprise outputting, by the device, the stream of content to modulators respectively associated with different channels for transmission of the first content of the stream of content and the second content of the stream of content, wherein the modulators are paired with respective transponders of a bonded satellite transponders configured to transmit modulated first content resulting from modulation of the first content and modulated second content resulting from modulation of the second content on a downlink via a selected transmission mode.

Figure 8:
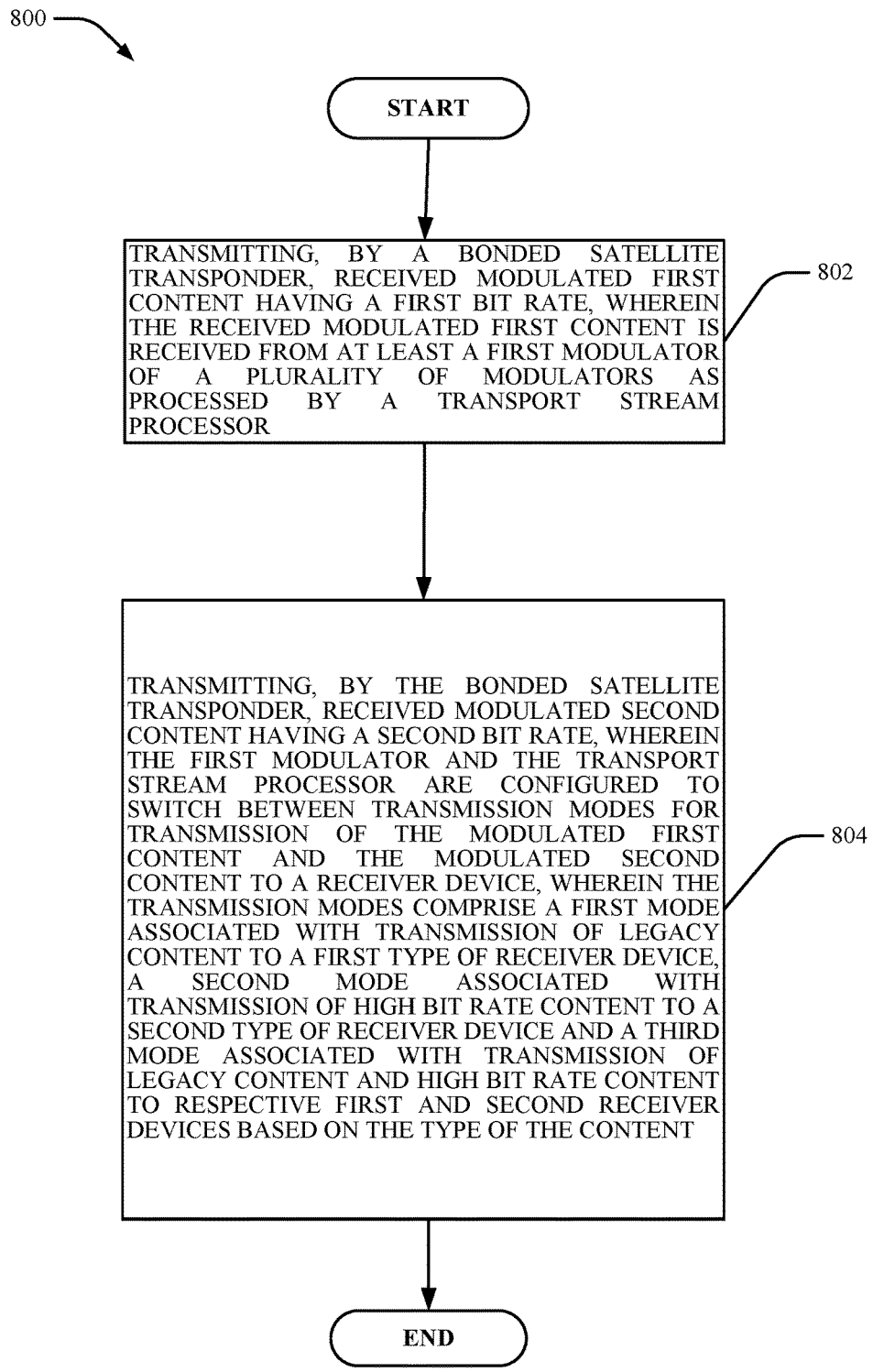

Turning now to FIG. 8, at 802, method 800 can comprise transmitting, by a bonded satellite transponder (e.g., BST 240), received modulated first content having a first bit rate, wherein the received modulated first content is received from at least a first modulator of a plurality of modulators as processed by a TSP. At 804, method 800 can comprise transmitting, by the bonded satellite transponder (e.g., BST 240), received modulated second content having a second bit rate, wherein the at least a first modulator and the TSP of the head end component are configured to switch between transmission modes for transmission of the modulated first content and the modulated second content to a receiver device, wherein the transmission modes comprise a first mode associated with transmission of legacy content to a first type of receiver device, a second mode associated with transmission of high bit rate content to a second type of receiver device and a third mode associated with transmission of legacy content and high bit rate content to respective first and second receiver devices based on the type of the content.

In some embodiments, the bonded satellite transponder, comprises: a group of first transponders at a first device (e.g., at BST 240), associated with a first group of modulators at a second device (e.g., at head end component 238) and configured to receive from the second device modulated first content having a first bit rate; and a second transponder other than the group of first transponders, wherein the second transponder is associated with a second modulator at the second device and is configured to receive from the second device modulated second content having a second bit rate, and wherein the TSP and the modulators are configured to switch between transmission modes for transmission of the modulated first content and the modulated second content to a receiver device.

In some embodiments, the transmission modes comprise: a first transmission mode wherein the first bit rate and the second bit rate are a same bit rate, the modulated first content and the modulated second content are legacy content, and the bonded satellite transponder is configured to transmit the modulated first content and the modulated second content to the receiver device, and wherein the receiver device is a first type of receiver device; a second transmission mode wherein the first bit rate and the second bit rate are the same bit rate, the modulated first content and the modulated second content are higher bit rate content than the legacy content, and the bonded satellite transponder is configured to transmit the modulated first content and the modulated second content to the receiver device, and wherein the receiver device is a second type of receiver device; and a third transmission mode wherein the first bit rate and the second bit rate are different bit rates, the modulated first content is a higher bit rate content than the modulated second content and the bonded satellite transponder is configured to transmit the modulated first content to the second type of receiver device and the modulated second content to the first type of receiver device.

In some embodiments, the TSP and/or modulators are configured to switch between transmission modes within an amount of time associated with a change of an electronic program guide channel displayed on a set top box having the receiver. For example, switching between the transmission modes can be performed within 1-2 seconds after detection of the change of the electronic program guide channel.

Figure 9:
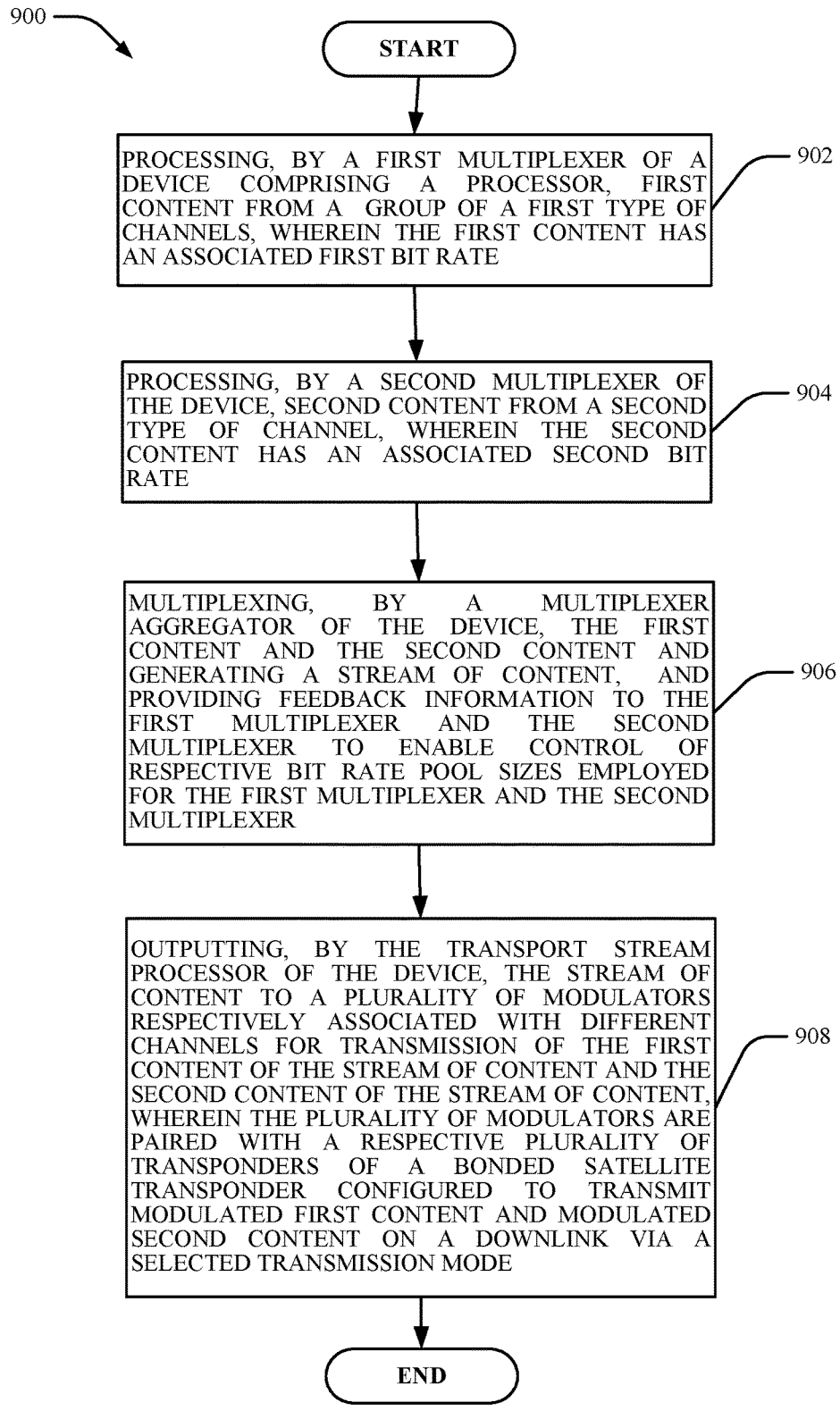

Turning now to FIG. 9, at 902, method 900 can comprise processing, by a device comprising a processor, first content from a group of a first type of channels, wherein the first content has an associated first bit rate (e.g., by the statistical multiplexer 214 of the head end component 238). At 904, method 900 can comprise processing, by the device, second content from a second type of channel, wherein the second content has an associated second bit rate (e.g., by the statistical multiplexer 216 of the head end component 238). In some embodiments, the first bit rate is greater than a first defined threshold and the second bit rate is less than a second defined threshold. For example, the first bit rate can be a bit rate associated with ultra high definition content and the second bit rate can be a bit rate associated with legacy content (which has a much lower bit rate than UHD content).

At 906, method 900 can comprise multiplexing, by the device, the first content and the second content and generating a stream of content (e.g., by the multiplexer aggregator 302 of the head end component 238). At 908, method 900 can comprise outputting, by the device, the stream of content to a plurality of modulators respectively associated with different channels for transmission of the first content of the stream of content and the second content of the stream of content, wherein the modulators are paired with respective transponders of a bonded satellite transponders configured to transmit modulated first content and modulated second content on a downlink via a selected transmission mode (e.g., by the TSP 218 of the head end component 238).

Figure 10:
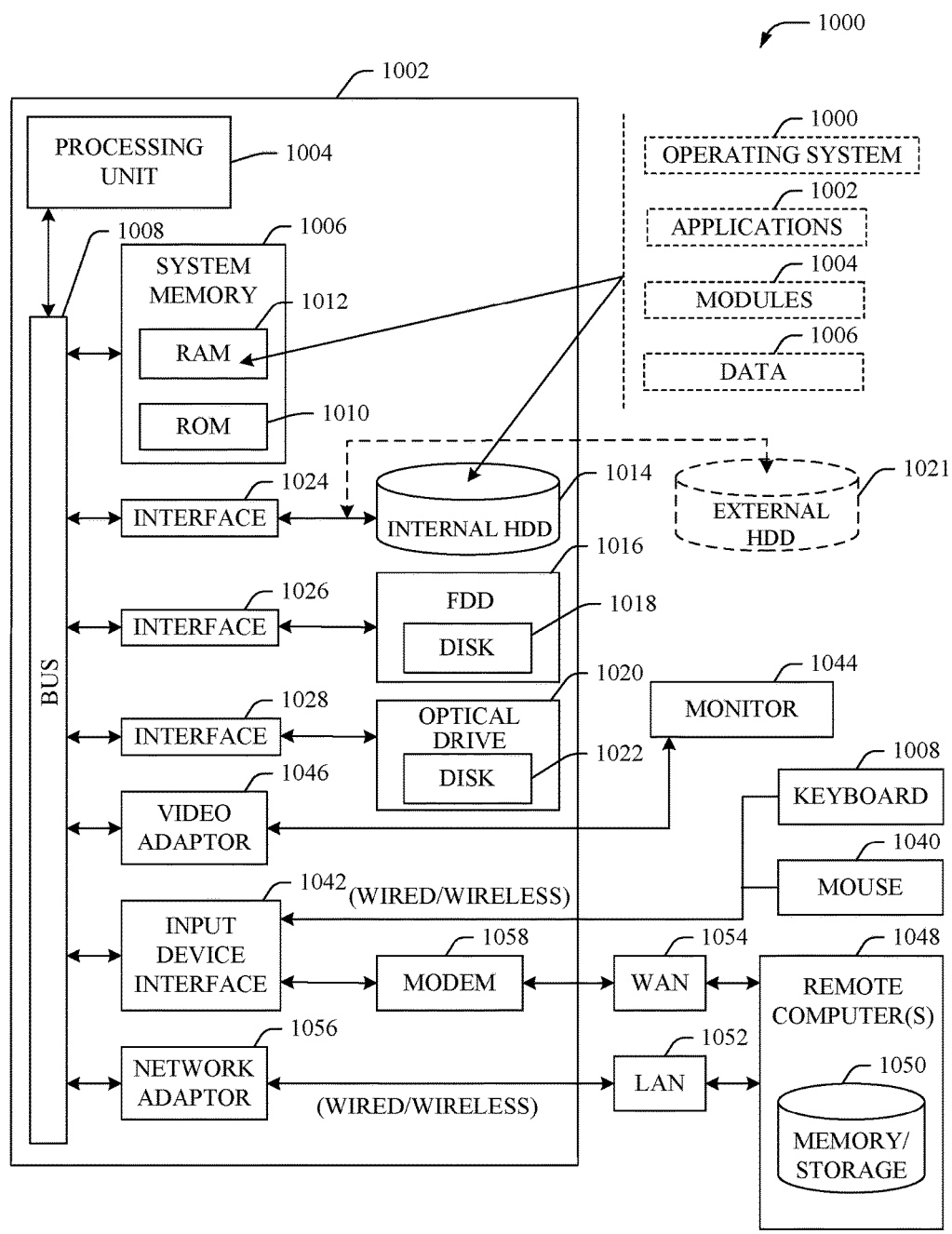
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, satellite 110, broadcast devices 102, 104, video playback device 112, statistical multiplexers 214, 216, TSP 218, multiplexer aggregator 302, antenna 226 and/or BST 240 (or a component of satellite 110, broadcast devices 102, 104, video playback device 112, statistical multiplexers 214, 216, TSP 218, multiplexer aggregator 302, antenna 226 and/or BST 240).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier (s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
   a first multiplexer configured to receive first content from first channels of a first type of channel;
   a second multiplexer configured to receive second content from second channels of a second type of channel; and
   a transport stream processor configured to:
      receive the first content and the second content; and
      output the first content and the second content to modulators respectively associated with different channels for transmission of the first type of channel and the second type of channel, wherein the different channels are transmitted to a bonded satellite transponder, which transmits to a receiver.

2. The apparatus of claim 1, wherein the first content is received via a first communication channel of the transport stream processor, and wherein the second content is received via a second communication channel of the transport stream processor.

3. The apparatus of claim 2, wherein the first content is associated with a higher bit rate than the second content, wherein the first content and the second content being output to the modulators comprises the first content being output to first transponders within the bonded satellite transponders and the second content being output to a second transponder within the bonded satellite transponders, and wherein the second transponder is a single transponder.

4. The apparatus of claim 2, wherein the first content and the second content are received as an aggregated stream of content output from a multiplexer aggregator, and wherein the aggregated stream of content comprises aggregated fixed bit rate content.

5. The apparatus of claim 4, wherein the multiplexer aggregator is coupled between the transport stream processor and the first multiplexer and the second multiplexer.

6. The apparatus of claim 4, wherein the multiplexer aggregator provides feedback information to the first multiplexer and the second multiplexer to enable control of respective bit rate pool sizes employed for the first multiplexer and the second multiplexer.

7. The apparatus of claim 4, wherein the transport stream processor is further configured to add signaling information to the aggregated fixed bit rate content, and wherein the signaling information is indicative of reconstruction information to reconstruct the aggregated fixed bit rate content at the receiver.

8. The apparatus of claim 7, wherein the reconstruction information is indicative of how the aggregated fixed bit rate content is separated and sent to individual pairs of the modulators and transponders of the bonded satellite transponders.

9. The apparatus of claim 1, wherein the first content and the second content being output to the modulators comprises the first content being output to transponders within the bonded satellite transponders, and wherein a transponder of the transponders and a modulator of the modulators comprise a modulator/transponder pair.

10. The apparatus of claim 1, wherein the first type of channel is an ultra high definition content channel and the second type of channel is a legacy content channel, and wherein a first bit rate of the ultra high definition content is a higher bit rate than a second bit rate of the legacy content channel.

11. The apparatus of claim 1, wherein the first multiplexer and the second multiplexer are statistical multiplexers.

12. The apparatus of claim 1, wherein the first type of channel is a video channel formatted according to an ultra high definition communication protocol.

13. The apparatus of claim 1, wherein the apparatus is configured to switch between different processing modes relating to operation of the first multiplexer, the second multiplexer and the transport stream processor on an order of 1-2 seconds.

14. The apparatus of claim 13, wherein a switching between the different processing modes corresponds to a change in content mix associated with a change in an electronic program guide channel determined to have occurred at the receiver.

15. A bonded satellite transponder, comprising:
a group of first transponders at a first device, associated with a first group of modulators and a transport stream processor at a second device, wherein the group of first transponders is configured to receive, from the second device, modulated first content having a first bit rate; and
a second transponder other than the group of first transponders, wherein the second transponder is associated with a second modulator at the second device and is configured to receive, from the second device, modulated second content having a second bit rate, and wherein the transport stream processor is configured to switch between transmission modes for transmission of the modulated first content and the modulated second content to a receiver device.

16. The bonded satellite transponder of claim 15, wherein the transmission modes comprise:
a first transmission mode wherein the first bit rate and the second bit rate are a same bit rate, the modulated first content and the modulated second content are legacy content, and the bonded satellite transponder is configured to transmit the modulated first content and the modulated second content to the receiver device, and wherein the receiver device is a first type of receiver device;
a second transmission mode wherein the first bit rate and the second bit rate are the same bit rate, the modulated first content and the modulated second content are higher bit rate content than the legacy content, and the bonded satellite transponder is configured to transmit the modulated first content and the modulated second content to the receiver device, and wherein the receiver device is a second type of receiver device; and
a third transmission mode wherein the first bit rate and the second bit rate are different bit rates, the modulated first content is a higher bit rate content than the modulated second content and the bonded satellite transponder is configured to transmit the modulated first content to the second type of receiver device and the modulated second content to the first type of receiver device.

17. The bonded satellite transponder of claim 15, wherein the switching between transmission modes is performed within an amount of time associated with a change of an electronic program guide channel displayed on a set top box comprising the receiver.

18. The bonded satellite transponder of claim 17, wherein the transmission modes are switched from a first transmission mode to a second transmission mode within 1-2 seconds after detection of the change of the electronic program guide channel.

19. A method, comprising:
processing, by a device comprising a processor, first content from a group of a first type of channels, wherein the first content has an associated first bit rate;
processing, by the device, second content from a second type of channel, wherein the second content has an associated second bit rate;
multiplexing, by the device, the first content and the second content and generating a stream of content; and
outputting, by the device, the stream of content to modulators respectively associated with different channels for transmission of the first content of the stream of content and the second content of the stream of content, wherein the modulators are paired with respective transponders of a bonded satellite transponders configured to transmit modulated first content resulting from modulation of the first content and modulated second content resulting from modulation of the second content on a downlink via a selected transmission mode.

20. The method of claim 19, wherein the first bit rate is greater than a first defined threshold and the second bit rate is less than a second defined threshold.

* * * * *